United States Patent [19]

Telles

[11] Patent Number: 4,637,143
[45] Date of Patent: Jan. 20, 1987

[54] PLOTTING DEVICE

[76] Inventor: Norman C. Telles, 80 Middle Rd., Acushnet, Mass. 02743

[21] Appl. No.: 718,781

[22] Filed: Apr. 1, 1985

[51] Int. Cl.[4] .......................... G01C 3/00; B43L 7/06
[52] U.S. Cl. ...................................... 33/457; 33/1 SB; 33/274; 33/277
[58] Field of Search ................. 33/431, 457, 454, 285, 33/277, 278, 274, 280, 403, 1 SB, 1 R

[56] References Cited

U.S. PATENT DOCUMENTS

| | | | |
|---|---|---|---|
| 785,756 | 3/1905 | Nutz | 33/454 |
| 1,161,625 | 11/1915 | Davison et al. | 33/457 |
| 2,924,882 | 2/1960 | Paine | 33/457 |

FOREIGN PATENT DOCUMENTS

| | | | |
|---|---|---|---|
| 512931 | 10/1920 | France | 33/457 |
| 1359313 | 3/1964 | France | 33/457 |
| 69615 | 1/1928 | Sweden | 33/403 |

Primary Examiner—Harry N. Haroian
Attorney, Agent, or Firm—Salter & Michaelson

[57] ABSTRACT

A course plotting device comprises substantially parallel first and second legs, substantially parallel third and fourth legs which are pivotally connected to the first and second legs so that they cooperate therewith to define a collapsible parallelogram structure, and a compass rose element mounted at the point of pivotal connection between an adjacent connected pair of the legs. The device is operable for plotting courses on a chart by aligning one of the legs with either a latitude or a longitude line on the chart and aligning one of the other legs with the desired course line. One embodiment of the device includes a vector element which is adjustably secured to one of the legs for plotting courses which have been compensated for the effects of winds and/or currents and another embodiment includes a pair of mirror elements which are operable for determining the relative bearing angles between remote objects.

6 Claims, 5 Drawing Figures

PLOTTING DEVICE

BACKGROUND AND SUMMARY OF THE INVENTION

The instant invention relates to plotting devices and more particularly to a plotting device which can be effectively utilized as a navigational instrument for plotting courses and also for determining relative angles between remote objects.

While a variety of different types of course plotting devices have been heretofore available for use as navigational instruments on boats, it has been found that most of the known course plotting devices are relatively difficult and awkward to operate. For this reason, it has been found that often many of the known course plotting devices cannot be reliably used to accurately plot course headings and that it is often impossible to use many of the known devices under rough sea conditions. In addition, most of the heretofore known plotting devices have not been easily operable to compensate for water currents, and therefore it has often been necessary to carry out independent vector calculations when using the known devices. Accordingly, for these reasons, the heretofore known plotting devices have not been entirely effective for plotting courses, and they have been highly prone to operator error, particularly when they have been used under rough sea conditions. Further, while it has long been recognized that it can be beneficial for boatsmen to be able to measure the relative angles or bearings between various remote objects in order to determine the positions of boats or to determine whether or not boats are on collision courses with other boats, none of the heretofore known plotting devices have been operative for taking relative bearing measurements of this type.

Devices representing the closest prior art to the invention of which the applicant is aware are disclosed in the U.S. patents to TAYLOR, U.S. Pat. Nos. 45,535, MILLER et al, 474,846, HAGAN, 726,677, DAVISON et al, 1,161,625, KENNEDY, 1,828,807, SIEFKER, 2,244,125, VAN SCIEVER, 2,433,249, and BANNER, 3,863,347. Of these references, the U.S. patents to TAYLOR and DAVISON et al are believed to be the most pertinent, but since they fail to suggest a device having the structural features of the plotting device of the instant invention or one which is operative in the simple and accurate manner of the device of the instant invention for plotting courses and/or for taking relative bearings, even these references are believed to be of only general interest.

The instant invention provides an effective plotting device which can be easily and accurately utilized for plotting courses, even under rough sea conditions, and which can also be utilized for measuring relative angles between remote objects. Specifically, the plotting device of the instant invention comprises first, second, third and fourth legs which are pivotally connected so that the first and second legs and the third and fourth legs are substantially parallel to each other and so that they cooperate to define a collapsible parallelogram structure, and means mounted at the point of pivotal connection between one pair of adjacent legs for determining the relative angle therebetween. The means for determining the angle between the pair of adjacent legs preferably comprises a true compass rose element which is mounted in the plotting device so that it remains substantially stationary with respect to one of the pair of adjacent connected legs when the first and second legs are pivoted relative to the third and fourth legs. The device preferably further comprises a magnetic compass rose element which is overlayed on the true compass rose element and mounted in concentric relation therewith so that it is rotatable relative to the true compass rose element, but so that it remains substantially stationary with respsect thereto when the first and second legs are pivoted relative to the third and fourth legs. The preferred embodiment of the device of the instant invention further comprises a vector element which is pivotally attached to one of the legs, and vector element angle determining means mounted at the point of pivotal attachment of the vector element for determining the relative angle between the vector element and the leg to which it is attached. The vector element is preferably adjustable to adjust the point along the extent thereof where it is pivotally attached and the vector element and the vector element angle determining means are preferably mounted so that they are adjustably positionable at a plurality of spaced points along the longitudinal extent of the leg to which they are attached and so that they remain substantially stationary with respect thereto when the first and second legs are pivoted relative to the third and fourth legs. In the preferred embodiment, the vector element and the leg angle determining means are either mounted at the point where the third leg of the device is pivotally connected to the first leg or where it is connected to the second leg, and the third leg is pivotally connected to the first and second legs so that it is adjustably positionable in substantially parallel relation to the fourth leg at a plurality of spaced points along the extents of the first and second legs, and the vector element angle determining means preferably comprises the leg angle determining means.

The second embodiment of the device of the instant invention which is operative for determining the relative angles between pairs of remote objects comprises the first, second, third and fourth legs, and the leg angle determining means, and first and second mirror elements. The first mirror element is mounted on the device where one of the third or fourth legs is attached to one of the first or second legs, and the second mirror element is mounted on the device where the same one of the third or fourth legs is attached to the other of the first or second legs. The first mirror element is mounted so that it remains stationary with respect to the adjacent one of the third or fourth legs when the first and second legs are pivoted relative to the third and fourth legs and the second mirror element is mounted on the device so that it remains stationary with respect to the adjacent one of the first or second legs when the first and second legs are pivoted relative to the third and fourth legs. Further, the first and second mirror elements are positioned so that they face generally toward one another when the third and fourth legs are in a predetermined position (preferably in perpendicular relation) relative to the first and second legs and the mirror elements are constructed so that an image of the second mirror element can be viewed in the first mirror element from the opposite side of the second mirror element from the first mirror element.

Accordingly, it is a primary object of the instant invention to provide a course plotting device which is simple to operate and which can be reliably used to accurately plot a course heading.

Another object of the instant invention is to provide a course plotting device which can effectively compensate for currents.

An even further object of the instant invention is to provide a plotting device which can be utilized for determining the relative bearings between pairs of remote objects.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
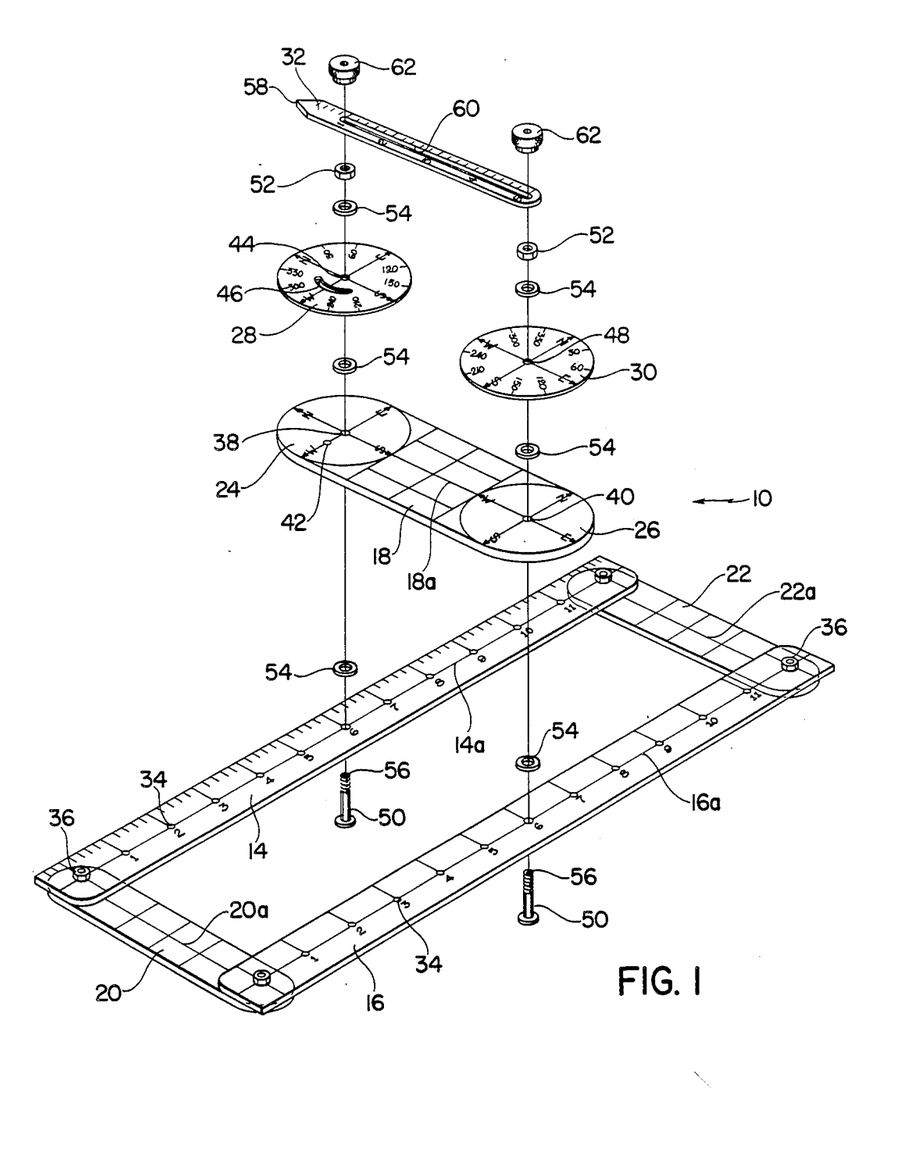
FIG. 1 is an exploded perpsective view of the device of the instant invention.
Figure 2:
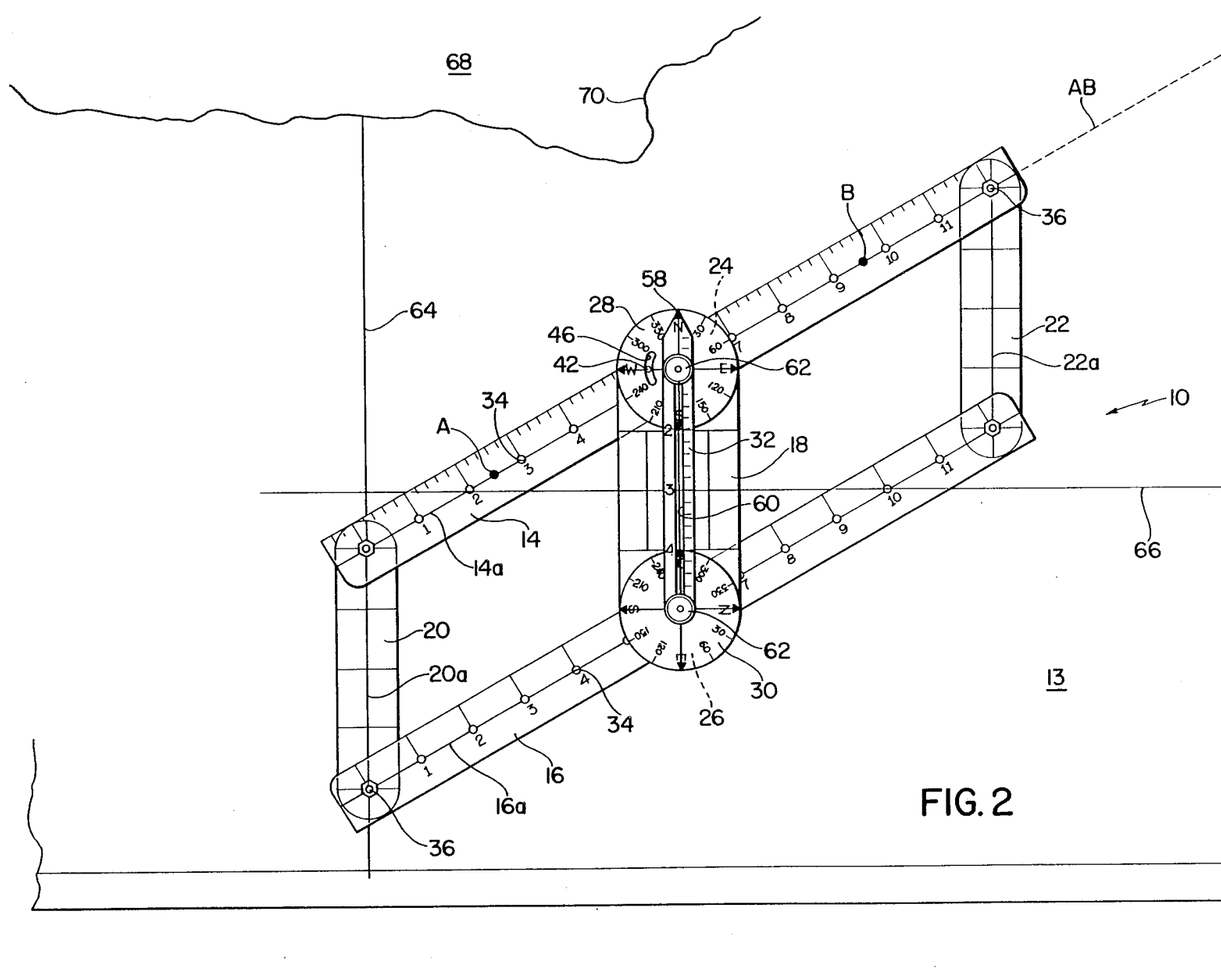
FIG. 2 is a plan view illustrating the use of the device for plotting a course on a chart.
Figure 3:
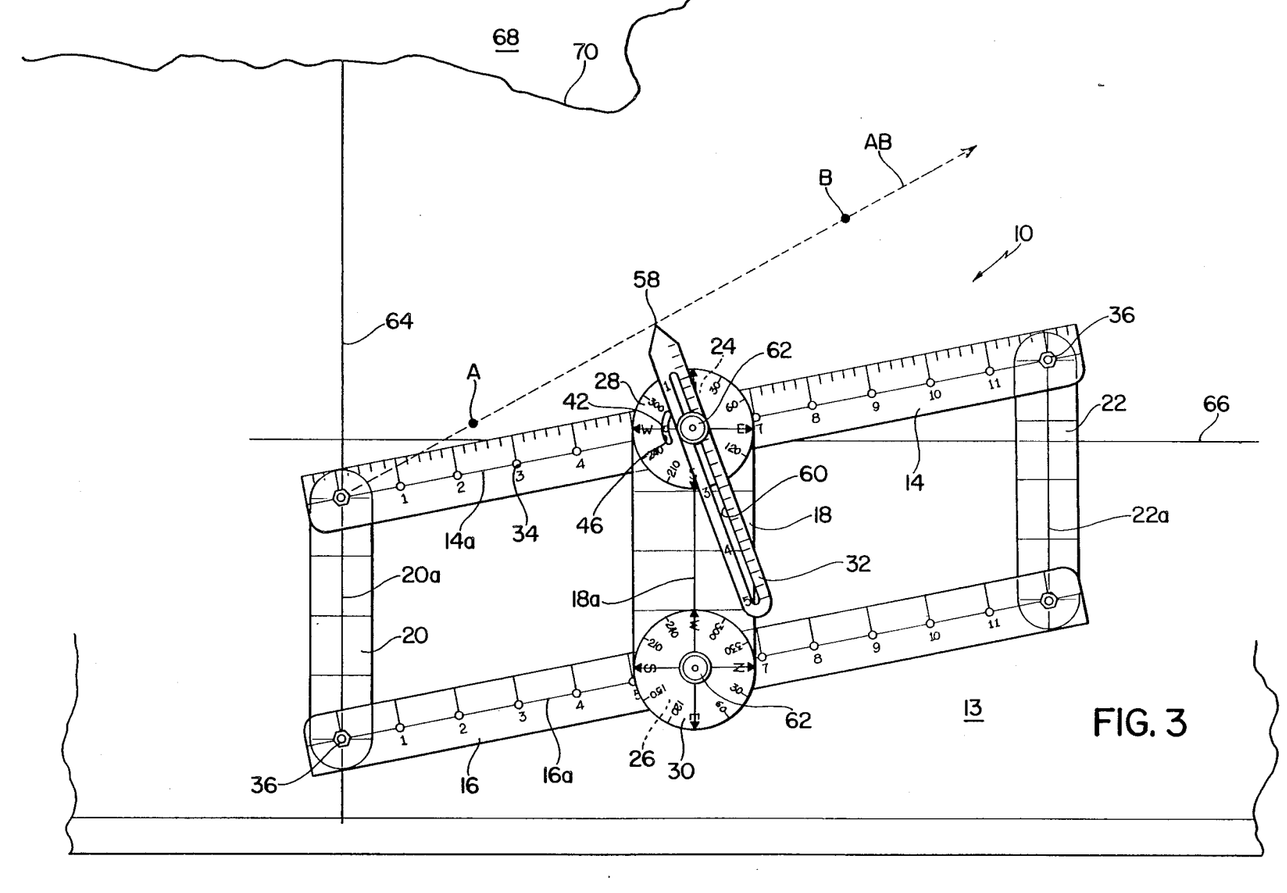
FIG. 3 is a similar view illustrating the use of the device for plotting a course which has been compensated for a current.
Figure 4:
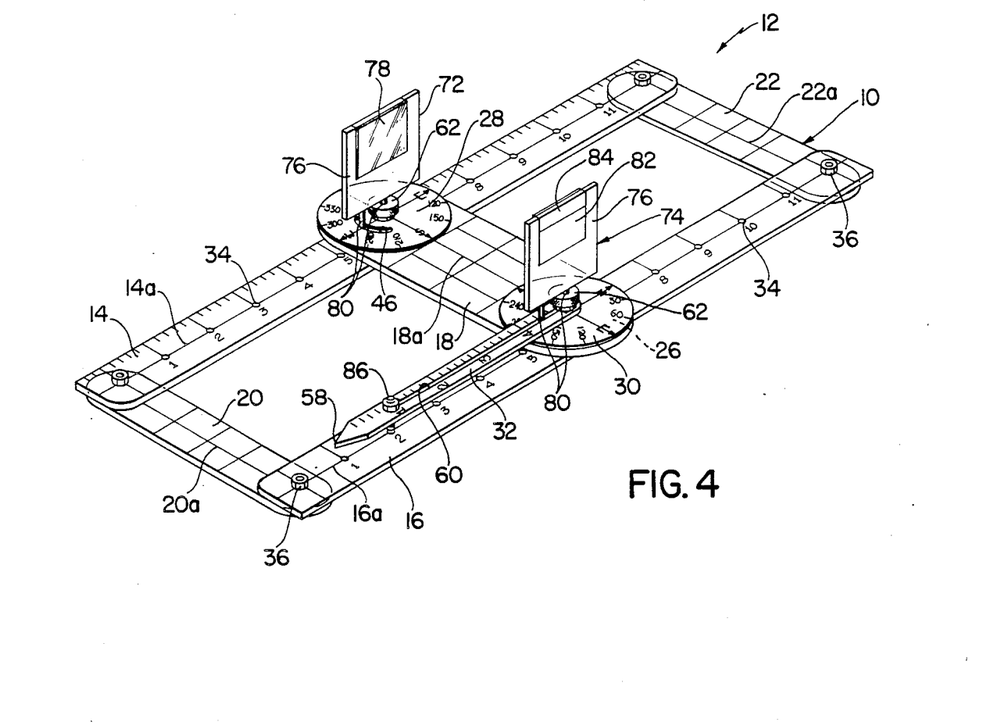
FIG. 4 is a perspective view of a second embodiment of the device.
Figure 5:
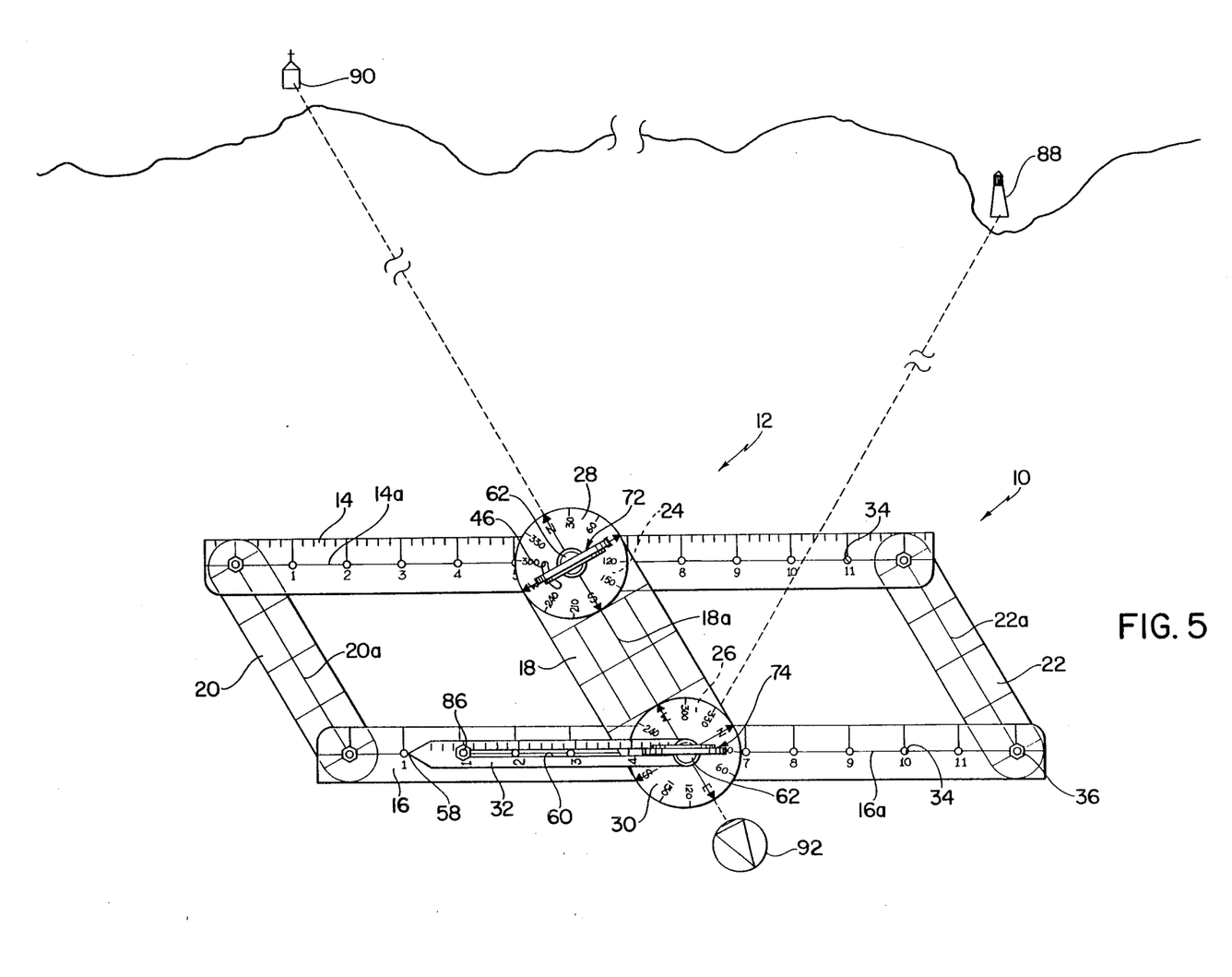
FIG. 5 is a plan view illustrating the use of the second embodiment of the device for taking a relative bearing between a pair of remote objects.

Referring now to the drawings, a first embodiment of the device of the instant invention is illustrated in FIGS. 1-3 and generally indicated at 10, and a second embodiment of the device of the instant invention is illustrated in FIGS. 4 and 5 and generally indicated at 12. The device 10 is operable for effectively and accurately plotting courses on a chart 13 of the type illustrated in FIGS. 2 and 3 for determining the proper course heading to be followed by a vessel located at point A on the chart 13 in order to reach a predetermined destination located at point B as will hereinafter be more fully set forth. The device 12, on the other hand, is operable for measuring the relative angles between pairs of remote objects, as illustrated in FIG. 5, and as will also hereinafter be more fully set forth.

The device 10 comprises first, second, third, fourth, and fifth legs 14, 16, 18, 20, and 22, respectively, having center lines or axes 14a, 16a, 18a, 20a, and 22a, respectively, first and second true compass rose elements 24 and 26, respectively, which are integrally formed at opposite ends of the third leg 18, first and second magnetic compass rose elements 28 and 30, respectively, which are concentrically mounted with respect to the true compass rose elements 24 and 26, respectively, and a vector element 32. The first and second legs 14 and 16, respectively, are preferably made of a relatively rigid, transparent plastic material and they preferably comprise elongated substantially straight, flat members having scale markings, including numeric indications of lengths, at regular increments along the extents thereof. The fourth and fifth legs 20 and 22, respectively, also comprise substantially flat, straight elongated members which are preferably made of a relatively rigid transparent plastic material and they are pivotally connected adjacent the ends thereof to the first and second legs 14 and 16, respectively, with suitable means, such as threaded screw and nut combinations 36. The fourth and fifth legs 20 and 22, respectively, are connected to the first and second legs 14 and 16, respectively, so that they are substantially parallel to each other and so that the first and second legs 14 and 16, respectively, are also substantially parallel to each other, whereby the first, second, fourth and fifth legs 14, 16, 20, and 22, respectively, cooperate to define a parallelogram structure which is collapsible as a result of the pivotal connections between the legs 14, 16, 20, and 22. The third leg 18 is also preferably made of a relatively rigid transparent plastic material and it also preferably comprises a substantially flat, straight member, although it is preferably constructed with a somewhat enlarged width as illustrated and it has a pair of spaced apertures 38 and 40 therein, adjacent opposite ends thereof. The third leg 18 is pivotally attached to the legs 14 and 16 in substantially parallel relation to the legs 20 and 22 so that it cooperates with the legs 14, 16, and 20 to define a collapsible parallelogram structure and so that it cooperates similarly with the legs 14, 16, and 22. The true compass rose elements 24 and 26 are also preferably transparent and they are preferably integrally formed adjacent opposite ends of the third leg 18 in concentric relation with the apertures 38 and 40, respectively, and they are defined by markings which indicate degrees of angular rotation about their respective center apertures 38 and 40, respectively. In this regard, the first true compass rose element 24 is preferably formed so that the markings thereon which designate zero degrees of rotation (north) are substantially aligned with the axis 18a of the leg 18, and an aperture 42 is preferably formed in the first true compass rose element 24 along a radial line thereof which is substantially perpendicular to the axis 18a. The second true compass rose element 26 is preferably formed so that the markings thereon which designate zero degrees of rotation (north) are disposed along a radial line thereof which is substantially perpendicular to the axis 18a of the leg 18. The first magnetic compass rose element 28 comprises a substantially flat circular disc made of a transparent material and having a central aperture 44 and an arcuate slot 46 therein, and it is formed with a plurality of markings thereon which are indicative of degrees of angular rotation about the aperture 44. The second magnetic compass rose element 30 is also of substantially flat, circular disc-like configuration, and it is also transparent and it has a central aperture 48 therein and a plurality of markings thereon which indicate various degrees of angular rotation about the aperture 48. The third leg 18 is assembled in the device 10 so that it is pivotally connected to the first and second legs 14 and 16 in substantially parallel relation to the fourth and fifth legs 20 and 22 and the first and second magnetic compass rose elements 28 and 30, respectively, are rotatably received in substantially concentric relation on the first and second true compass rose elements 24 and 26, respectively. Suitable means, such as screws 50 and nuts 52 are utilized for pivotally securing the third leg 18 to the first and second legs 14 and 16, respectively, and also for securing the magnetic compass rose elements 28 and 30 on the true compass rose elements 24 and 26, and washers 54 are interposed between the various elements on the screws 50 to make them more easily rotatable. Accordingly, it will be seen that the magnetic compass rose elements 28 and 30 are rotatable relative to the third leg 18 and also relative to their respective true compass rose elements 24 and 26, but so that they remain stationary or unrotated relative to the leg 18 and their respective true compass rose elements 24 and 26 when the first and second legs 14 and 16 are pivoted relative to the third and fourth legs 18 and 20. The slot 46 in the magnetic compass rose element 28 is positioned and configured so that it communicates with the aperture 42 in the true compass rose element 24 when the compass rose element 28 is assembled thereon. The screws 50 are preferably formed with reduced axial bores 56 therein which extend inwardly from the threaded ends thereof for reasons which will hereinafter be set forth. The vector element 32 comprises an elongated member which preferably terminates in a pointed end 58 and has an elongated slot 60 therein which extends a distance along the longitudinal extent of the vector element 32. The vector element 32 is preferably further formed with markings, including numerical indications of length, at regular intervals along the longitudinal extent thereof, the markings on the vector element 32 preferably being spaced by intervals which correspond with the intervals between the markings on the primary legs 14 and 16. The vector element 32 is assembled in the device 10 so that at least one of the screws 50 is received through the slot 60. In this regard, for retaining the vector element 32 in an operative position, as illustrated in FIGS. 1 and 2, it is assembled in the device 10 so that it is received on both of the screws 50 and knurled nuts 62 are received on the screws 50 for detachably securing the vector element 32 thereon. Alternatively, the vector element 32 is assembled on only one of the screws 50 for securing it in an operative position as illustrated in FIG. 3, wherein it can be utilized for determining a vessel course heading which has been compensated for the effects of a current as will hereinafter be more fully set forth.

Referring now to FIG. 2, the use of the device 10 for plotting a course between the points A and B along a line AB on the chart 13 is illustrated. In this regard, it should be pointed out that although the device 10 is operable for compensating for the effects of magnetic variation and also for the effects of winds and/or currents, the use of the device 10 as illustrated in FIG. 2 is exemplary of a simplified operation of the device 10 for determining a course heading which has not been corrected for these effects. As illustrated in FIG. 2, the chart 13 has a longitude line 64 thereon and also a latitude line 66 thereon, and it depicts an area which is primarily covered by a large body of water, but which is bordered by a land mass 68 having a shoreline 70. As further illustrated in FIG. 2, for use of the device 10 to determine a course heading which has not been compensated for magnetic variation, the first magnetic compass rose element 28 is positioned in rotationally aligned relation with the first true compass rose element 24. The device 10 is then positioned on the chart 13 so that the legs 18, 20, and 22 are aligned with true north and so that either the first leg 14 or the second leg 16 is aligned with the desired course line AB. As illustrated, this can be done by positioning the device 10 so that one of the axes 18a, 20a, or 22a, is aligned with the longitude line 64 and so that either the axis 14a of the first leg 14 or the axis 16a of the second leg 16 is aligned with the course line AB. When the device 10 has been oriented in this position on the chart 13, the true compass rose element 24 and the magnetic compass rose element 28 provide an indication of the angular relation between the first and third legs 14 and 18, respectively, which corresponds to the angular disposition of the course line AB. As will be seen, the course line AB on the chart 13 has an angular disposition of approximately 60° relative to true north and therefore a vessel traveling from point A to point B would be required to follow a course heading of approximately 60°, assuming that the effects of magnetic variation and currents are negligible. Further, while in the example illustrated in FIG. 2, the device 10 is operated by aligning the legs 18, 20, and 22 with true north on the chart 13, in some instances it is more convenient to align one of them with a latitude line, such as the line 66. In this case, the first and second legs 14 and 16 are again aligned with the course line AB, but the second true and magnetic compass rose elements 26 and 30 are aligned with true north and utilized to provide an indication of the desired course heading along the line AB in a manner similar to that hereinabove described relative to the first true and magnetic compass rose elements 24 and 28.

In many instances, magnetic variation may not be negligible and it may be desirable to compensate the device 10 for magnetic variation in order to obtain the correct course heading to be followed from point A to point B. In order to compensate the device for magnetic variation, the appropriate magnetic compass rose element 28 or 30 is rotated relative to its respective true compass rose element 24 or 26 by an amount which is equal to the magnetic variation in the particular locality prior to operating the device 10 to determine a course heading. The device 10 can then be operated in the manner hereinabove described to provide a corrected course heading on the appropriate magnetic compass rose element 28 or 30.

Referring now to FIG. 3, the operation of the device 10 for determining a course heading which has been compensated for the effects of a current is illustrated. For simplicity, in the example illustrated in FIG. 3, the device 10 is again operated under the assumption that magnetic variation is negligible, although the device 10 can easily be compensated for magnetic variation in the manner hereinabove described by rotating the appropriate magnetic compass rose element 28 or 30 relative to its respective true compass rose element 24 or 26. In the example illustrated in FIG. 3, the device 10 is operated for plotting a compass course between points A and B for a vessel which is capable of traveling at a speed of 6 knots under conditions wherein there is a current having a set (direction of travel) of 340° and a drift (speed) of 2 knots. First, the position of the third leg 18 is adjusted relative to the first and second legs 14 and 16, respectively, so that it is parallel to the fourth and fifth legs 20 and 22, respectively, but spaced from the points of pivotal attachment of the fourth leg 20 to the first and second legs 14 and 16, respectively by a distance which corresponds to the 6 knot speed of the vessel, i.e., the leg 18 is positioned so that the screws 50 extend through the apertures 34 which are adjacent the numerals 6 on the legs 14 and 16. The vector element 32 is then positioned in an operative position wherein it is pivotally attached to only the first leg 14 and wherein it is oriented so that it extends in a direction of 340° as indicated by the adjacent first magnetic compass rose element 28 and so that the distance from the point of pivotal attachment of the vector element 32 to the terminal end 58 corresponds to the 2 knot drift of the current, i.e. so that the screw 50 is adjacent the numeral 2 on the vector element 32. The device 10 is then positioned on the chart 13 so that the legs 18, 20, and 22 are aligned with true north in the manner hereinabove set forth. The device 10 is further positioned on the chart 13 so that the line AB intersects the axis 14a at the 0 point on the scale on the leg 14, i.e. where the first leg 14 is attached to the fourth leg 20, and so that the end 58 of the vector element 32 is positioned on the line AB. When the device 10 has been positioned on the chart 13 in this manner, the first leg 14 provides an indication of the course which must be followed in order to go from point A to point B and the angular disposition of this course can be determined from the first magnetic compass rose element 28 in the manner hereinabove set forth. As will be seen from FIG. 3, although the line AB extends in a direction of approximately 60°, a boat which is traveling at 6 knots must follow a compass heading of approximately 80° when traveling from point A to point B in order to compensate for a current having a set of 340° and a drift of 2 knots. Again, it is possible to make compensation for magnetic variation in the manner hereinabove described. It is also possible to operate the device 10 by orientating the legs 18, 20, and 22 with a line of latitude and mounting the vector element 32 on the second leg 16 instead of on the first leg 14 so that the desired course heading is determined utilizing the second true and magnetic compass rose elements 26 and 30. Further, it should be pointed out that while in the embodiment of the plotting device of the instant invention herein set forth, the leg 18 is adjustably positionable relative to the legs 14 and 16 by repositioning it at different apertures 34 therein, other embodiments wherein the legs 14 and 16 are formed with elongated longitudinal slots therein so that the leg 18 is slidably adjustable relative to the legs 14 and 16 are contemplated.

Referring now to FIGS. 4 and 5, the device 12 which is operative for determining the relative bearing angles between pairs of remote objects is illustrated. The device 12 comprises the device 10 plus a pair of first and second mirror elements generally indicated at 72 and 74, respectively. The first mirror element 72 comprises a mounting portion 76 and a substantially flat mirror piece 78 which is mounted in the mounting portion 76 so that it is pivotable about an axis which is substantially parallel to the plane of the first and second legs 14 and 16, respectively. The mounting portion 76 comprises a substantially flat generally U-shaped plate and a pair of spaced, substantially parallel mounting pins 80 which extend from one edge of the mounting portion 76. The first mirror element 72 is mounted on the device 10 so that one of the pins 80 of the mounting portion 76 thereof is received in the bore 56 in the screw 50 which extends through the legs 14 and 18 and so that the other pin 80 thereof is received in the aperture 42 in the first true compass rose element 24 through the slot 46. Accordingly, when the legs 18, 20, and 22 are pivoted relative to the legs 14 and 16, the first mirror element 72 remains substantially stationary with respect to the third leg 18. The second mirror element 74 also comprises a mounting portion 76, but it includes a mirror piece 82 of reduced height and a transparent piece 84 which is attached thereto in substantially coplanar relation. The mirror piece 82 and the transparent piece 84 are mounted in the mounting portion 76 of the second mirror element 74 so that the transparent piece 84 is positioned above the mirror piece 82 and so that they are pivotable together about an axis which is substantially parallel to the plane of the legs 14 and 16. The mounting portion 76 of the second mirror element 74 also includes a pair of pins 80, and one of the pins 80 thereof is received in the bore 56 in the screw 50 which extends through the legs 16 and 18, the other pin 80 of the second mirror element 74 being received in the slot 60 of the vector element 32. In this regard, in the device 12, the vector element 32 is received on the screw 50 which extends through the legs 16 and 18 and it is secured in substantially parallel relation to the leg 16 with a threaded screw and nut combination 86. Accordingly, the vector element 32 maintains the second mirror element 74 in substantially stationary relation with respect to the second leg 16 when the legs 14 and 16 are pivoted relative to the legs 18, 20, and 22. Hence, the first and second mirror elements 72 and 74, respectively, are angularly respositioned with respect to each other when the legs 14 and 16 are pivoted relative to the legs 18, 20, and 22 by an amount which is indicated on the first magnetic compass rose element 28.

The use and operation of the device 12 is illustrated in FIG. 5. First, the device 12 is positioned so that the first true and magnetic compass rose elements 24 and 28, respectively, are in angularly aligned relation, so that the legs 18, 20, and 22 are disposed in substantially perpendicular relation to the legs 14 and 16, and so that the mirror elements 72 and 74 face one another, i.e. the mounting portions thereof are in substantially parallel planes. The device 12 is then operated by an operator by looking from the the back side of the second mirror element 74 through the transparent piece 84 to observe a remote object, such as the object 88. An image of the same object which is reflected from the second mirror element 74 should then be visible in the mirror piece 78 of the first mirror element 72, although it may be necessary to pivot the mirror pieces 78 and/or 82 slightly in their respective mounting portions 76 to make the image visible in the mirror piece 78. In any event, after the image of the object 88 is visible in the mirror piece 78, it is aligned with the object 88 to assure that the mounting portions 76 are parallel. Thereafter, in order to determine the relative angle between the first remote object 88 and a second remote object 90, the legs 18, 20, and 22 are pivoted relative to the legs 14 and 16 while maintaining the image of the first object 88 in the mirror piece 78 of the first mirror element 72. When the legs 18, 20, and 22 have been repositioned relative to the legs 14 and 16 so that the image of the first object 88 in the mirror piece 78 is aligned with the object 90, the extent to which the mirror elements 72 and 74 have been angularly repositioned with respect to each other is read on the compass rose element 30. The use of the device 12 in this manner is illustrated in FIG. 5 wherein an eye 92 is shown as a schematic illustration of an eye of a user. By applying well known principles of geometry and physics, it is known that the relative angle between the objects 88 and 90 is twice the angle between the mirror elements 72 and 74 and therefore by doubling the measurement which is indicated on the compass rose element 30, the relative bearing angle between the objects 88 and 90 can be determined. This angle measurement can then be utilized for various purposes in navigation such as for determining the location of a vessel or for determining whether or not two vessels are on a collision course.

It is seen therefore that the instant invention provides an effective plotting device which, because of its simplicity, can be utilized under almost any sea conditions for determining the proper course heading for a vessel. The device 10 is operable simply by aligning one of the legs thereof with a line of latitude or longitude on a chart instead of using a compass rose on the chart and it is quickly and easily operable for providing desired course headings. The device 10 is also operable for compensating course headings for magnetic variation and for the effects of currents. Further, the device 10 is operable by using a compass rose on a chart in a more conventional manner, and it can be operated as a conventional parallel rule. In addition, while the device 10 can be effectively utilized in the boating applications as hereinabove described, the use of the device 10 in a variety of other plotting aplications in connection with boating and in a variety of plotting applications not necessarily connected with boating, such as in drafting, etc., are contemplated. The device 12 can be effectively utilized for determining relative bearings between remote objects simply by installing the mirror elements 72 and 74 on the device 10 and operating it in the manner described. Accordingly, the instant invention provides an effective navigational tool which is simple and easy to operate and which can be reliably used, even under adverse conditions, to provide both course headings and relative bearings. Hence, it is seen that the instant invention represents a significant advancement in the art which has substantial, practical and commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A plotting device comprising first, second, third, and fourth legs, said first and second legs being substantially parallel, said third and fourth legs being substantially parallel, extending between said first and second legs, and being pivotally connected thereto so that said first, second, third, and fourth legs cooperate to define a collapsible, parallelogram structure, leg angle determining means for determining the relative angles between an adjacent connected pair of said legs, a vector element pivotally attached to one of said legs, and vector angle determining means located at the point of pivotal attachment of said vector element for determining the relative angle between said vector element and said leg to which it is attached, said vector element and said vector element angle determining means being adjustably positionable at a plurality of points along the longitudinal extent of said leg to which they are attached and remaining stationary with respect thereto when said first and second legs are pivoted relative to said third and fourth legs.

2. In the device of claim 1, said vector element being adjustable to adjust the point along the longitudinal extent thereof at which it is pivotally attached to said one of said legs.

3. In the device of claim 2, said vector element being mounted at the point where said adjacent connected pair of legs are pivotally connected, said adjacent connectd pair comprising said third leg, said third leg being adjustably securable in substantially parallel relation to said fourth leg at a plurality of spaced points along the extents of said first and second legs, said vector element angle determining means comprising said leg angle determining means.

4. The device of claim 3 further comprising a fifth leg, said fifth leg being substantially parallel to said third and fourth legs and being pivotally connected to said first and second legs.

5. A plotting device comprising first, second, third and fourth legs, said first and second legs being substantially parallel, said third and fourth legs being substantially parallel, extending between said first and second legs, and being pivotally connected thereto so that said first, second, third, and fourth legs cooperate to define a collapsible, parallelogam structure, leg angle determining means for determining the relative angles between an adjacent connected pair of said legs, and first and second mirror elements, said first mirror element being mounted on said device at the point where one of said third or fourth legs is attached to one of said first or second legs, said second mirror element being mounted on said device at the point where said one of said third or fourth legs is attached to the other of said first or second legs, said first mirror element remaining stationary with respect to the adjacent one of said third or fourth legs when said first and second legs are pivoted relative to said third and fourth legs, said second mirror element remaining stationary with respect to the adjacent one of said first or second legs when said first and second legs are pivoted relative to said third and fourth legs, said first and second mirror elements being positioned so that they face generally toward one another when said third and fourth legs are in a predetermined position relative to said first and second legs and being constructed so that an image of said second mirror element can be viewed in said first mirror element from the opposite side of said second mirror element from said first mirror element.

6. In the device of claim 5, said first and second mirror elements each comprising a mounting portion and a mirror piece mounted in the respective mounting portion, the mirror pieces of said first and second mirror elements being mounted so that they are pivotable about axes which are substantially parallel to the plane of said first and second legs.

* * * * *